US008009100B2

(12) United States Patent
Falk

(10) Patent No.: US 8,009,100 B2
(45) Date of Patent: Aug. 30, 2011

(54) RADIO FREQUENCY EMITTER DETECTION AND LOCATION METHOD AND SYSTEM

(75) Inventor: Kent Olof Falk, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 459 days.

(21) Appl. No.: 12/306,011

(22) PCT Filed: Jun. 27, 2006

(86) PCT No.: PCT/SE2006/000782
§ 371 (c)(1), (2), (4) Date: Dec. 22, 2008

(87) PCT Pub. No.: WO2008/002205
PCT Pub. Date: Jan. 3, 2008

(65) Prior Publication Data
US 2009/0267836 A1    Oct. 29, 2009

(51) Int. Cl.
*G01S 5/02* (2010.01)

(52) U.S. Cl. .................................................. 342/465
(58) Field of Classification Search .................. 342/383, 342/465
See application file for complete search history.

(56) References Cited

U.S. PATENT DOCUMENTS

| | | | | |
|---|---|---|---|---|
| 5,459,668 A * | 10/1995 | Dogan et al. | .................. | 701/223 |
| 5,909,646 A * | 6/1999 | Deville | .......................... | 455/313 |
| 6,018,317 A * | 1/2000 | Dogan et al. | .................. | 342/378 |
| 6,711,528 B2 * | 3/2004 | Dishman et al. | .............. | 702/189 |

* cited by examiner

*Primary Examiner* — Gregory C Issing

(57) ABSTRACT

A system and method for detecting and locating a radio frequency emitter. A number, N, of receiving units using the same bandwidth, center frequency, and measurement time duration receive signals from the emitter. Higher Order Statistics (HOS) are used to calculate a correlation function between the received signals using one of the received signals as a reference. Results of the correlation function are used to form volumes of probabilities in a subset of an N−1 dimensional space of information regarding the location of the emitter. Each correlation function result in the subset corresponds to a single point in physical space.

14 Claims, 4 Drawing Sheets

RADIO FREQUENCY EMITTER DETECTION AND LOCATION METHOD AND SYSTEM

TECHNICAL FIELD

The present invention relates to a radio frequency emitter detection and location method where a number N, the number N being at least three, of receiving units, using the same bandwidth B, centre frequency $f_c$ and measurement time duration T, are used for receiving signals from at least one emitter.

The present invention also relates to a radio frequency emitter detection and location system comprising a number N, the number N being at least three, of receiving units, using the same bandwidth B, centre frequency $f_c$ and measurement time duration T, which are receiving units are arranged for receiving signals from at least one emitter, where the system further comprises means for calculating a correlation function c between the received signals.

BACKGROUND

In a number of applications, there is a desire to locate one or more emitters, arranged for emitting electromagnetic energy such as radio transmissions, TV and radar, for example at microwave frequencies via an antenna. Normally this energy is in the form of so-called radio frequency, which refers to that portion of the electromagnetic spectrum in which electromagnetic energy can be generated by alternating current fed to an antenna. Today, a number of methods are employed.

Old emitter location systems use AOA (Angle Of Arrival), while present emitter location systems use TDOA (Time Difference Of Arrival) and FDOA (Frequency Difference Of Arrival).

The devices used for emitter location are in the following referred to as receiving units.

In prior art FIG. 1, a top view of a landscape is shown, where a first emitter 1, and a second emitter 2 are shown. There is furthermore a first receiving unit 3 and a second receiving unit 4. The distance between the first emitter 1 and the first receiver 3 is $D_{13}$, the distance between the first emitter 1 and the second receiver 4 is $D_{14}$, the distance between the second emitter 2 and the first receiver 3 is $D_{23}$ and the distance between the second emitter 2 and the second receiver 4 is $D_{24}$.

The signal transmitted by the first emitter 1 is $u_1(t)$ and the signal transmitted by the second emitter 2 is $u_2(t)$. The corresponding received signal, received by the first receiving unit 3, is expressed as $u_1(t-D_{13}/c_0)+u_2(t-D_{23}/c_0)$, where t is time and $c_0$ is the speed of light in the medium present for propagation. The corresponding received signal, received by the second receiving unit 4, is expressed as $u_1(t-D_{14}/c_0)+u_2(t-D_{24}/c_0)$.

When regarding the first emitter 1 only, the received signal, received by the first receiving unit 3, is $u_1(t-D_{13}/c_0)$, and the received signal, received by the second receiving unit 4, is $u_1(t-D_{14}/c_0)$. These received signals are then fed into a correlation calculation algorithm according to the following:

$$c(\tau)=\int u_1(t-D_{13}/c_0)u_1(t-D_{14}/c_0+\tau)dt \qquad (1)$$

where $c(\tau)$ is the correlation at the time difference $\tau$. A corresponding correlation calculation may be formulated for the second emitter 2 as well.

In prior art FIG. 2, a graphical representation of $c(\tau)$ is shown. Peaks will occur at $\tau_1=(D_{14}-D_{13})/c_0$ and at $\tau_2=(D_{24}-D_{23})/c_0$. On the $\tau$-axis, the difference between the distances $D_{14}-D_{13}$ and $D_{24}-D_{23}$ between an emitter and the respective receiving units is indicated by means of the $\tau$-position of the peak. If the peak occurs at a certain time difference $\tau$, that time may be used for calculating a corresponding difference in physical distance; $D_{14}-D_{13}=c_0\cdot\tau_1$ and $D_{24}-D_{23}=c_0\cdot\tau_2$.

In this example, for the first emitter 1, the difference between the distances between the emitter 1 and the respective receiving units 3, 4 is zero; $D_{13}=D_{14}$, i.e. $\tau_1=0$, which is indicated by a corresponding continuous line function 5, where a peak 6 occurs at a $\tau$-value $\tau_1=0$. For the second emitter 2, the difference between the distances between the emitter 2 and the respective receiving units 3, 4 is not zero; $D_{23}\neq D_{24}$, i.e. $\tau_2\neq 0$, which is indicated by a corresponding dashed line function 7, where a peak 8 occurs at a $\tau$-value $\tau_2\neq 0$.

In prior art FIG. 3, a top view of the first receiving unit 3 and the second receiving unit 4 is shown. For different emitter positions, calculations of equation (1) give rise to different values of $\tau$. As stated previously, a specific time difference $\tau$ corresponds to a certain physical distance, constituting the difference in physical distance between the receiving units and the emitter. For a specific time difference $\tau$, a corresponding hyperbola, where the focal points are located at the receiving units, may be calculated. It is a geometrical fact that such a difference in physical distance may be drawn as a hyperbola, where all points of the hyperbola constitute that certain difference in physical distance. In other words, an emitter, giving rise to said certain time difference $\tau$ is located along one specific hyperbola.

In FIG. 3, a number of hyperbolas drawn with a continuous line are shown, where a first hyperbola 9 corresponds to the value $\tau=\tau_b$, a second hyperbola 10 corresponds to the value $\tau=\tau_a$, a third hyperbola 11 corresponds to the value $\tau=0$, a fourth hyperbola 12 corresponds to the value $\tau=-\tau_a$ and a fifth hyperbola 13 corresponds to the value $\tau=-\tau_b$. The third degenerate hyperbola 11 corresponds to the case where there is no difference between the distances between the emitter in question and the respective receiving unit 3, 4.

There is a problem, however, since it only is indicated that an emitter is located along a certain hyperbola, not where on said hyperbola.

In a further prior art example, attempting to overcome this problem, an emitter 14 and three receiving units, a first receiving unit 15, a second receiving unit 16 and a third receiving unit 17, are positioned as shown in the top view prior art FIG. 4, it is possible to perform the calculation according to equation (1) pair-wise for the receiving units. Each pair-wise calculation results in a certain $\tau$, which in turn gives rise to a certain hyperbola.

The first receiving unit 15 and second receiving unit 16 give rise to a first continuous line hyperbola 18, the first receiving unit 15 and third receiving unit 17 give rise to a second dashed-line hyperbola 19 and the second receiving unit 16 and third receiving unit 17 give rise to a third dot-dashed-line hyperbola 20. The hyperbolas 18, 19, 20 intersect in a first intersection point 21, a second intersection point 22, a third intersection point 23, a fourth intersection point 24, a fifth intersection point 25 and a sixth intersection point 26.

Where those hyperbolas 18, 19, 20 intersect, it is most likely that the emitter in question 14 is positioned. In FIG. 4, the emitter 14 is not exactly positioned along any of the hyperbolas 18, 19, 20, and therefore not exactly at any one of the intersection points 21, 22, 23, 24, 25, 26, which is the most likely scenario in reality, due to measurement inaccuracies.

In short, the correct location of a single emitter is the crossing of all hyperbola lines obtained from each pair of receivers.

Instead of time correlation, it is possible to perform frequency correlation, which provides similar results for moving targets and/or moving receiving units. The major difference is that the simple hyperbolic curve shape will be replaced by a complex quadratic curve shape.

Examples of systems using frequency correlation are disclosed in "Electronic Warfare Target Location Methods" by Richard A Poisel, ISBN 1-58053-968-8, chapter 3.2.2, Differential Doppler", page 174-175.

There is, however, a problem with this approach, since, as shown in FIG. 4, there are a number of intersection points, and it may be difficult to sort out "false" intersections. In the example according to FIG. 4, there are six intersection points 21, 22, 23, 24, 25, 26, where none exactly corresponds to the exact location of the emitter 14.

Using the approach above can in other words result in several possible crossings, false and true ones, especially if many emitters are present simultaneously.

This results in an association problem between correlation peaks calculated with data from different pairs of receivers, that increases in complexity as the number of simultaneous emitters increases. Another problem is that so-called multipath propagation will result in false emitter detections and locations. Multipath occurs when a transmitted signals is reflected, for example in a lake, resulting in two different paths with different delays for the same original signal.

Special geometries can be even more difficult to analyze, for example if the intersection takes place where the hyperbolas in question are close to parallel.

The prior art examples above have only discussed the two-dimensional case. In the three-dimensional case, for example if an emitter is air-borne, a three-dimensional rotational hyperbolic surface is calculated instead, defined by the two-dimensional hyperbola as it rotates along a line which passes through those two receiving units which are committed at the moment.

SUMMARY

The objective problem that is solved by the present invention is to provide a method and arrangement for locating one or more emitters, said emitters being arranged for emitting electromagnetic energy such as radio transmissions, TV and radar, for example at microwave frequencies, where the mentioned disadvantage with false locations is eliminated. Normally this electromagnetic energy is in the form of so-called radio frequency, which refers to that portion of the electromagnetic spectrum in which electromagnetic energy can be generated by alternating current fed to an antenna.

This objective problem is solved by means of a method according to the introduction, which method furthermore comprises the steps: calculating a correlation function c between the received signals $s_0, s_1 \ldots s_{N-1}$, calculating a correlation function c between the received signals $s_0, s_1 \ldots s_{N-1}$, using one of the received signals $s_0$ as a reference, where HOS (Higher Order Statistics) is used for performing said calculation of the correlation c; and using said correlation function results to form volumes of probabilities in a subset of an N−1-dimensional space of information regarding the location of a certain emitter, where each correlation function result in said subset corresponds to a single point in the physical space.

This objective problem is also solved by means of a system according to the introduction, where furthermore one of the received signals $s_0$ is a reference and where the correlation function c is calculated by means of HOS (Higher Order Statistics), where said correlation function results form volumes of probabilities in a subset of an N−1-dimensional space of information regarding the location of a certain emitter, where each correlation function result in said subset corresponds to a single point in the physical space.

According to a preferred embodiment, the correlation function c is calculated using time differences $\tau_1 \ldots \tau_{N-1}$, where one receiving unit is used as a reference receiving unit for time, and the differences in time for the signal to reach the receiving units are measured relative to said reference receiving unit.

According to another preferred embodiment, the correlation function c is calculated using differential Doppler frequencies $\omega_{d1} \ldots \omega_{dN-1}$, where one receiving unit is used as a reference receiving unit for differential Doppler frequency, and the differences in Doppler frequencies between the receiving units are measured relative to said reference receiving unit.

According to another preferred embodiment, the correlation function c is calculated by means of HOS according to $$c_\tau(\tau_1 \ldots \tau_{N-1} \mid \forall s_n) = \begin{cases} \frac{1}{T} \cdot \int_0^T s_0(t) \cdot \prod_{n=1}^{N-1} s_n(t - \tau_n) \cdot dt & N \text{ even} \\ \frac{1}{T} \cdot \int_0^T s_0^2(t) \cdot \prod_{n=1}^{N-1} s_n(t - \tau_n) \cdot dt & N \text{ odd} \end{cases}$$

or $$c_\tau(\omega_{d1} \ldots \omega_{dN-1} \mid \forall S_n) =$$

$$\begin{cases} \frac{1}{2 \cdot \pi \cdot B} \cdot \int_{2\pi(f_c - B/2)}^{2\pi(f_c + B/2)} S_0(\omega) \cdot \prod_{n=1}^{N-1} S_n(\omega - \omega_{dn}) \cdot d\omega & N \text{ even} \\ \frac{1}{2 \cdot \pi \cdot B} \cdot \int_{2\pi(f_c - B/2)}^{2\pi(f_c + B/2)} S_0^2(\omega) \cdot \prod_{n=1}^{N-1} S_n(\omega - \omega_{dn}) \cdot d\omega & N \text{ odd} \end{cases}$$

Other preferred embodiments are disclosed in the dependent claims.

Several advantages are achieved by means of the present invention, for example:
- the risk of false emitter locations in a scenario with several emitters is minimized;
- the problem with mulipath propagation is reduced to a minimum;
- the number of HOS (Higher Order Statistics) functions to be evaluated is not dependent on the number of receivers or emitters; and
- emitter signals with lower signal-to-noise ratio can be detected compared to prior art.

BRIEF DESCRIPTION OF DRAWINGS

The present invention will now be described more in detail with reference to the appended drawing, where.

DETAILED DESCRIPTION

Figure 1:
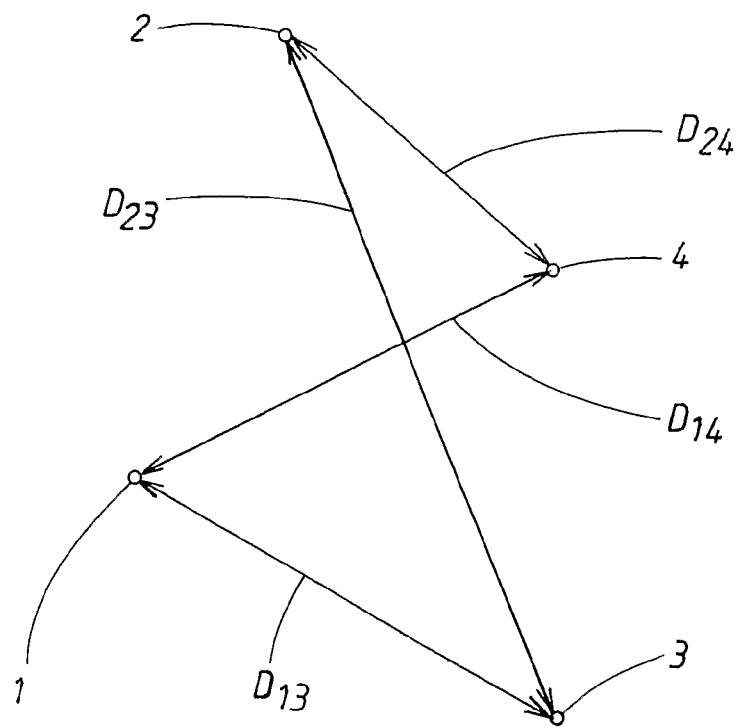
FIG. 1 shows a top view of a prior art system for emitter detection.
Figure 2:
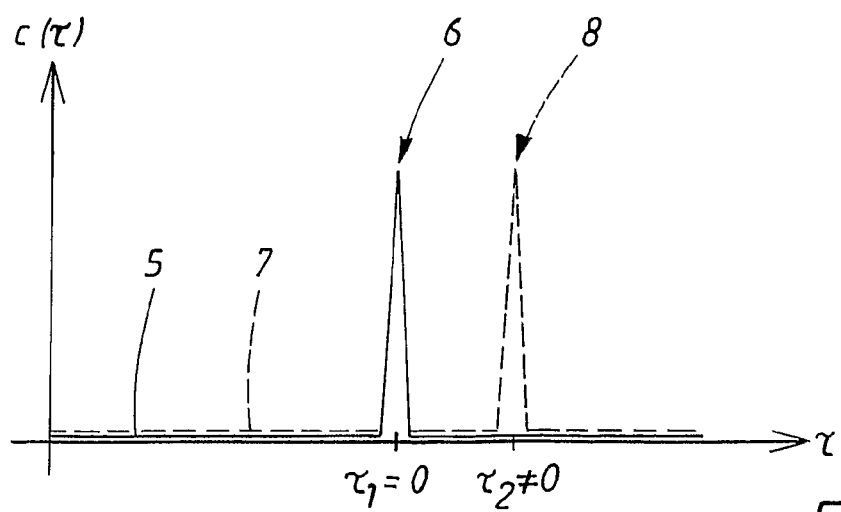
FIG. 2 shows a graphic representation of the correlation in time between received signals.
Figure 3:
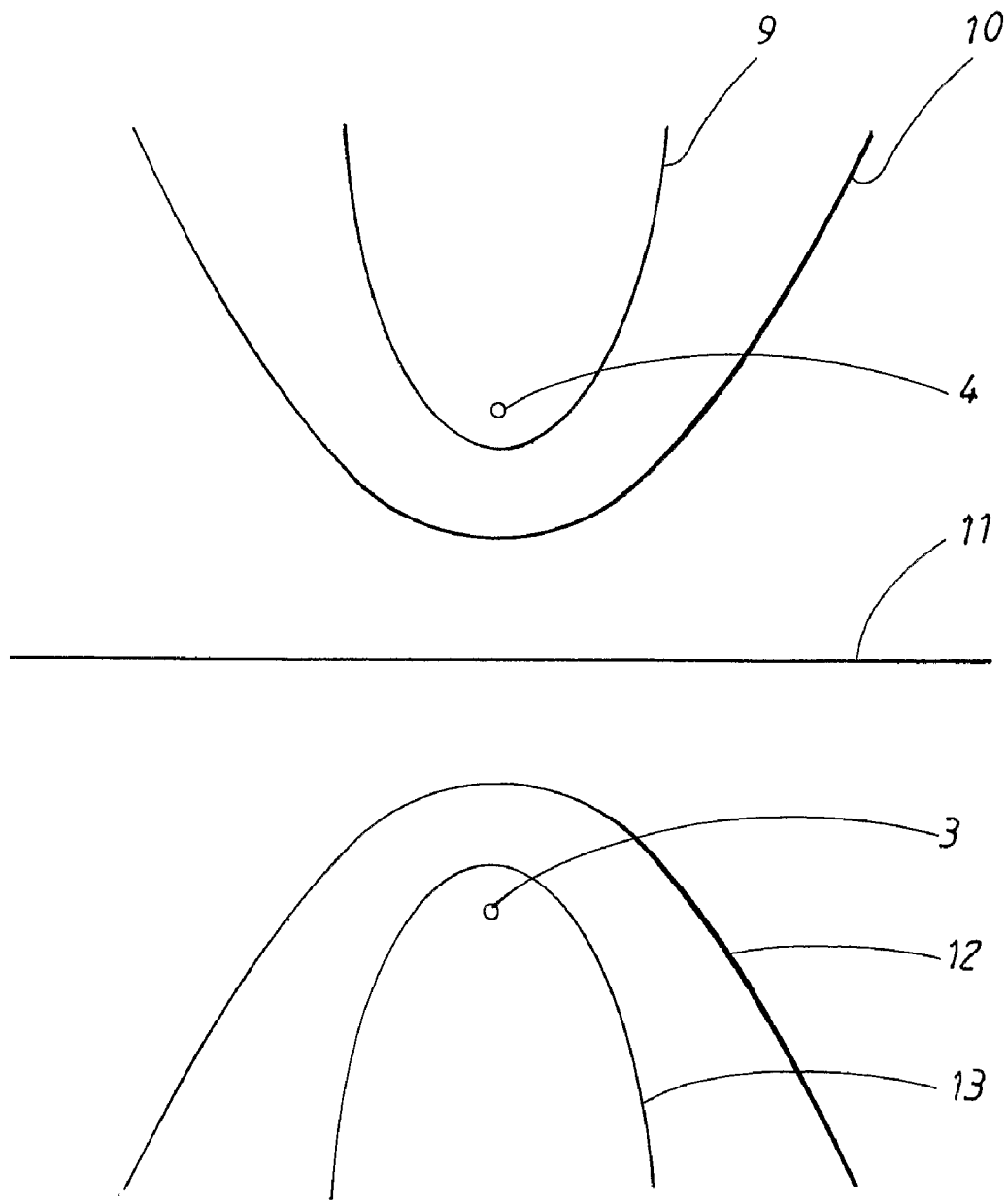
FIG. 3 shows a top view of a prior art system for emitter detection.
Figure 4:
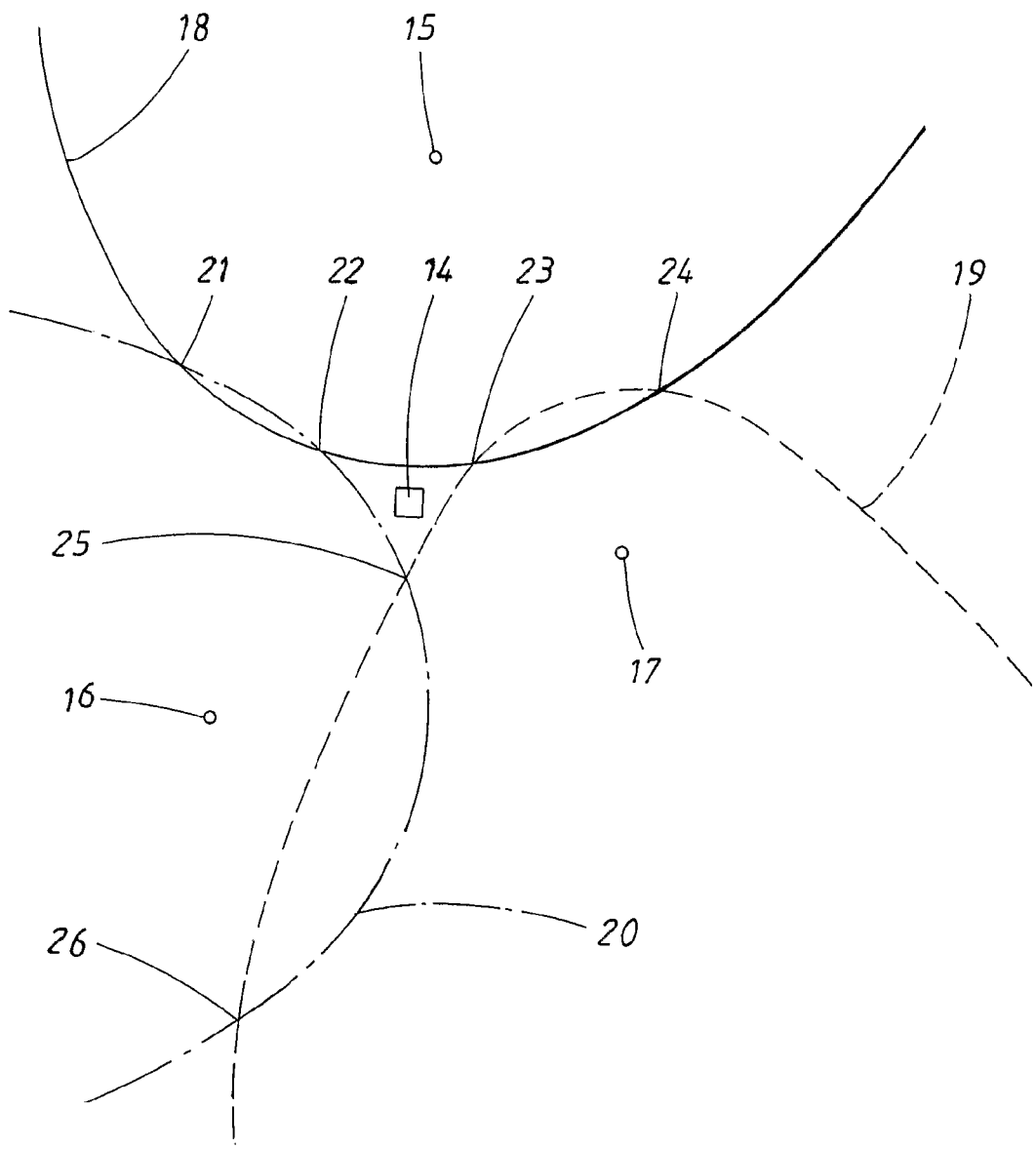
FIG. 4 shows a top view of a prior art system for emitter detection.
Figure 5:
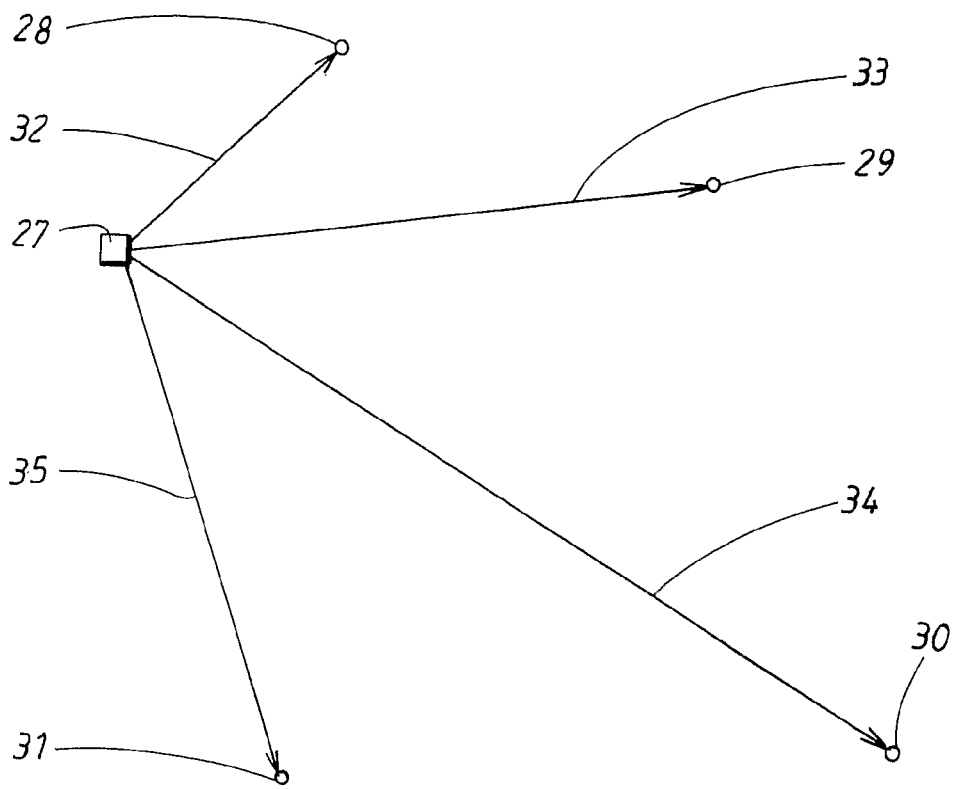
FIG. 5 shows a top view of a system for emitter detection according to the present invention.

In FIG. 5, a top view of a landscape is shown, where a first emitter 27 is shown.

The devices used for emitter location are in the following referred to as receiving units. Each receiving unit comprises receiving equipment.

In FIG. 5, there is furthermore a first receiving unit 28, a second receiving unit 29, a third receiving unit 30 and a fourth receiving unit 31. A signal s(t) transmitted by the first emitter, and which is received by the first, second, third and fourth receiving unit, is indicated with a respective continuous line arrow 32, 33, 34, 35.

First order of statistics is the average value, second order of statistics is the correlation and the third order and higher is known as higher order of statistics (HOS).

According to the present invention, higher order statistics is used to process the information from at least three receiving units simultaneously.

All the receiving units use the same bandwidth B, centre frequency $f_c$ and measurement time duration T. Generally, the signal received in receiving unit n is denoted $s_{n-1}(t)$ as a function of time and $S_{n-1}(\omega)$ as a function of frequency According to a first preferred embodiment, still with reference to FIG. 5, the first receiving unit 28 is chosen as a reference receiving unit for time, i.e. the differences in time for the signal to reach the receiving units are measured relative to the first receiving unit. In other words, the time difference for the first receiving unit is always zero. The time difference for the second receiving unit 29 is $\tau_1$, the time difference for the third receiving unit 30 is $\tau_2$ and the time difference for the fourth receiving unit 31 is $\tau_3$.

The signal received by the first receiving unit 28 is $s_0(t)$, the signal received by the second receiving unit 29 is $s_1(t)$, the signal received by the third receiving unit 30 is $s_2(t)$ and the signal received by the fourth receiving unit 31 is $s_3(t)$.

Then we calculate the correlation c, using HOS, as $$c(\tau_1,\tau_2,\tau_3) = \int s_0(t) s_1(t-\tau_1) s_2(t-\tau_2) s_3(t-\tau_3) dt \quad (2)$$

Correctly normalized, this equation results in "clouds", or volumes, of probabilities in a three-dimensional space of information, comprising points of distance differences, when the time differences have been translated to distance differences. In this context, the act of normalizing means that the value of the correlation c is scaled in such a way that its output lies between 0 and 1. In most cases, the range dependence is not a function of either time or frequency, and could be moved outside the integration. A suitable normalization will include the range dependence Only a subset of said space of information comprises distance difference points that correspond to single points in the physical space, such that each correlation function result in said subset corresponds to a single point in the physical space.

There are points which do not exist in physical space, which points correspond to distance differences that are impossible for single path propagation. For example, the largest possible distance difference is the distance between the two receivers that are farthest away from each other. There is also a degenerated case, where all receiving units are positioned in a straight line, where two corresponding points exist in the physical space for certain correlation function results. Both these types of correlation function results are excluded from said subset in order to avoid ambiguities.

If the emitter 27 is moving, the integration time has to be adapted to that speed of that motion. The higher speed of the motion of the emitter 27, the shorter the integration time.

According to a second preferred embodiment, also with reference to FIG. 5, the first receiving 28 unit is used as a reference receiving unit for frequency, i.e. the differential Doppler frequency between the signals reaching the second, third and fourth receiving units 29, 30, 31 are measured relative to the first receiving unit. In other words, the differential Doppler frequency for the first receiving 28 unit is always zero. The differential Doppler frequency for the second receiving unit 29 is $\omega_{d1}$, the differential Doppler frequency for the third receiving unit 30 is $\omega_{d2}$ and the differential Doppler frequency for the fourth receiving unit 31 is $\omega_{d3}$.

The signal received by the first receiving unit 28 is $S_0(\omega)$, the signal received by the second receiving unit 29 is $S_1(\omega)$, the signal received by the third receiving unit 30 is $S_2(\omega)$ and the signal received by the fourth receiving unit 31 is $S_3(\omega)$.

Then we calculate the correlation c, using HOS, as $$c(\omega_1,\omega_2,\omega_3) = \int S_0(\omega) S_1(\omega-\omega_{d1}) S_2(\omega-\omega_{d2}) S_3(\omega-\omega_{d3}) d\omega \quad (3)$$

In the same way as before, this equation, correctly normalized, results in "clouds", or volumes, of probabilities in a three-dimensional space of information, comprising points of velocity differences, when the frequency differences have been translated to velocity differences.

In a third preferred embodiment, the receiving units 28, 29, 30, 31 are arranged for receiving information regarding time difference as well as differential Doppler frequency. Then calculations according to both the first and the second preferred embodiments are performed. In this manner, a more accurate estimate of the position of the emitter 27 is obtained.

Generally, if there are N receiving units, this results in an N−1 dimensional space of information. One receiving unit, preferable the one with lowest noise level, is chosen as a reference. This is of greatest importance in the case with an odd number N of receivers. Each point in this N−1 dimensional space corresponds to a set of N−1 time delays and N−1 differential Doppler frequencies. In most cases, these delays and/or differential Doppler frequencies correspond to a single point in the physical space, which point is the estimation of the emitter location.

Only the subset of the N−1 dimensional space of information that corresponds to single points in the physical space has to be calculated.

As stated previously, all N receivers use the same bandwidth B, centre frequency $f_c$ and measurement time duration T. The signal received in receiver n is denoted $s_{n-1}(t)$ as a function of time and $S_{n-1}(\omega)$ as a function of frequency. The correlation c is then calculated by means of HOS according to equation (4) (generalized TDOA) and/or according to equation (5) (generalized FDOA).

$$c_\tau(\tau_1 \ldots \tau_{N-1} \mid \forall s_n) = \begin{cases} \dfrac{1}{T} \cdot \displaystyle\int_0^T s_0(t) \cdot \prod_{n=1}^{N-1} s_n(t-\tau_n) \cdot dt & N \text{ even} \\ \dfrac{1}{T} \cdot \displaystyle\int_0^T s_0^2(t) \cdot \prod_{n=1}^{N-1} s_n(t-\tau_n) \cdot dt & N \text{ odd} \end{cases} \quad (4)$$

$$c_\omega(\omega_{d1} \ldots \omega_{dN-1} \mid \forall S_n) = \qquad (5)$$

$$\begin{cases} \dfrac{1}{2\cdot\pi\cdot B} \cdot \displaystyle\int_{2\pi\cdot(f_c-B/2)}^{2\pi\cdot(f_c+B/2)} S_0(\omega) \cdot \prod_{n=1}^{N-1} S_n(\omega-\omega_{dn}) \cdot d\omega & N \text{ even} \\ \dfrac{1}{2\cdot\pi\cdot B} \cdot \displaystyle\int_{2\pi\cdot(f_c-B/2)}^{2\pi\cdot(f_c+B/2)} S_0^2(\omega) \cdot \prod_{n=1}^{N-1} S_n(\omega-\omega_{dn}) \cdot d\omega & N \text{ odd} \end{cases}$$

A high value of the correlation (HOS) function c indicates a possible emitter. As stated previously, in most cases, the delays and/or differential Doppler frequencies correspond to a single point in the physical space. Correctly normalized, the correlation function c results form volumes of probabilities in a subset of an N−1-dimensional space of information regarding the location of a certain emitter, where each correlation function result in said subset corresponds to a single point in the physical space. As stated previously, the degenerated case, with all receiving units in a straight line, is not comprised in said subset.

Only the subset of the N−1-dimensional space of information in the correlation function c that corresponds to a point in the physical space has to be calculated. The number of correlation functions c to be evaluated is therefore only dependent on the volume of interest and the density of correlation function evaluations, and not on the number of receivers.

For equation (4), for a certain subset of all sets of delay times $\tau_n$, each delay time corresponds to a single point in the physical space, where the correctly normalized values of the correlation function c form volumes of probabilities in said subset of said N−1-dimensional space of information regarding the location of a certain emitter.

For equation (5), for a certain subset of all sets of differential Doppler frequencies $\omega_{dn}$, each differential Doppler frequency corresponds to a single point in the physical space, and where the correctly normalized values of the correlation function c form volumes of probabilities in said subset of said N−1-dimensional space of information regarding the location of a certain emitter.

Figure 6:
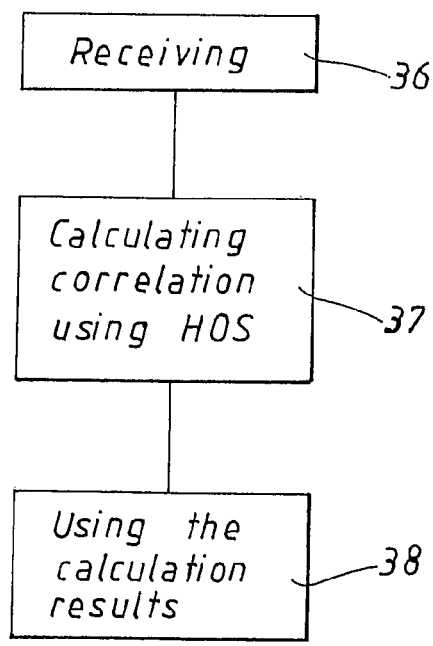
FIG. 6 shows a method block diagram.

The radio frequency emitter detection and location method according to the present invention comprises the following method steps, with reference to FIG. 6:

Using 36 a number N, the number N being at least three, of receiving units 28, 29, 30, 31, using the same bandwidth B, centre frequency $f_c$ and measurement time duration T, for receiving signals $s_0, s_1 \ldots s_{N-1}$ from at least one emitter 27, the method further comprising the steps:

calculating 37 a correlation function c between the received signals $s_0, s_1 \ldots s_{N-1}$, using one of the received signals $s_0$ as a reference, where HOS (Higher Order Statistics) is used for performing said calculation of the correlation c; and using 38 said correlation function results to form volumes of probabilities in a subset of an N−1-dimensional space of information regarding the location of a certain emitter 27, where each correlation function result in said subset corresponds to a single point in the physical space.

Each set of delays $\tau_1, \tau_2 \ldots \tau_{N-1}$ and/or differential Doppler frequencies $\omega_{d1}, \omega_{d2} \ldots \omega_{dN-1}$ that results in a high value of the HOS function correspond to a possible emitter. The signal from each emitter can be estimated according to equation (6) and/or equation (7):

$$s_n(t \mid \forall \tau_n) = \frac{s_0(t) + \sum_{n=1}^{N-1} s_n(t - \tau_n)}{N} \tag{6}$$

$$s_n(\omega \mid \forall \omega_{dn}) = \frac{S_0(\omega) + \sum_{n=1}^{N-1} S_n(\omega - \omega_{dn})}{N} \tag{7}$$

No association of correlation results from pair-wise correlated receiving units is needed. The risk of false emitter locations in a scenario with several emitters is minimized.

As a consequence of the fact that only the subset of the N−1-dimensional space of information in the HOS function that corresponds to a point in the physical space is calculated, the problem with mulipath propagation is reduced to a minimum. A peak in the correlation function, caused by multipath propagation, which corresponds to a point in the physical space, is very rare especially if many receivers are used simultaneously.

Emitter signals with lower signal to noise ratio can be detected compared to the case with pair wise correlated receivers. The noise suppression increases with the order of the statistics used, the full advantage of several receivers is utilized.

The invention is not limited to the preferred embodiments described above, but may vary freely within the scope of the appended claims. For example, the receiver bandwidth B does not need to be identical as long as there is a common sub-band $B_c$, where $B_c \neq 0$. The processing can then be done over the common sub-band of the bandwidths of all N receivers, n=1 . . . N. The common sub-band is defined as: $B_c = \cap \forall B_n$. The same possibility exists in the time domain. The measuring time T doesn't need to be identical as long as there is some common time $T_c$ where $T_c \neq 0$. The processing can then be done over the common measuring time in all N receivers, n=1 . . . N. The common measuring time is defined as: $T_c = \cap \forall T_n$.

An other example is a more symmetrical definition of the correlation function c:

$$c'_\tau(\tau_1 \ldots \tau_{N-1} \mid \forall s_n) = \frac{1}{T} \cdot \int_0^T s_0^{\frac{2m}{N}}(t) \cdot \prod_{n=1}^{N-1} s_n^{\frac{2m}{N}}(t - \tau_n) \cdot dt \tag{8}$$

$$c'_\omega(\omega_{d1} \ldots \omega_{dN-1} \mid \forall S_n) = \tag{9}$$
$$\frac{1}{2 \cdot \pi \cdot B} \cdot \int_{2\pi \cdot (f_c - B)}^{2\pi \cdot (f_c + B)} S_0^{\frac{2m}{N}}(\omega) \cdot \prod_{n=1}^{N-1} S_n^{\frac{2m}{N}}(\omega - \omega_{dn}) \cdot d\omega$$

Here, m is an arbitrary positive integer. Observe that m could be chosen as N/2 when N is even. With this choice, the equations above will correspond to the equations (4) and (5) in the case with N even.

The act of normalizing scaling the value of the correlation c in such a way that its output lies between 0 and 1 is just mentioned as a preferred example, since it facilitates the possibility to interpret each correlation result as a probability. The necessity of normalizing and its properties is depending on the exact application, for some applications no normalizing is needed at all.

The fact that the first receiving unit 28 is chosen as a reference receiving unit depends on that the distance between the emitter and the first receiving unit 28 is the shortest distance of the distances between the emitter and the receiving units 28, 29, 30, 31. This in turn is due to that it is preferable that the receiving unit with the lowest noise level is chosen as a reference. This is of course not a requirement for the present invention, but generally any receiving unit may be chosen as a reference.

Due to the degenerated case which may occur when all receivers are positioned on a straight line implies that such a positioning should be avoided. The degenerated case may, however, be useful if it is known that no transmitters are positioned on a certain side of such a line.

The invention claimed is:

1. A method of detecting and locating a radio frequency emitter, said method comprising the steps of:
    receiving a number of signals ($s_0, s_1 \ldots s_{N-1}$) from the emitter by a number (N) of receiving units using the same bandwidth (B), centre frequency ($f_c$) and measurement time duration (T), wherein N is at least three;
    utilizing Higher Order Statistics (HOS) to calculate a correlation function (c) between the received signals using one of the received signals ($s_0$) as a reference; and
    utilizing results of the correlation function to form volumes of probabilities in a subset of an N−1-dimensional space of information regarding the location of the emitter, wherein each correlation function result in the subset corresponds to a single point in physical space.

2. The method according to claim 1, wherein the correlation function (c) is calculated using time differences ($\tau_1 \ldots \tau_{N-1} \ldots$), where one receiving unit is used as a reference unit for receiving time measurements, and the differences in time for the signal to reach the other receiving units are measured relative to the reference receiving unit.

3. The method according to claim 2, wherein the correlation function (c) is calculated by means of HOS according to:

$$c_\tau(\tau_1 \ldots \tau_{N-1} \mid \forall s_n) = \begin{cases} \dfrac{1}{T} \cdot \int_0^T s_0(t) \cdot \prod_{n=1}^{N-1} s_n(t - \tau_n) \cdot dt & N \text{ even} \\ \dfrac{1}{T} \cdot \int_0^T s_0^2(t) \cdot \prod_{n=1}^{N-1} s_n(t - \tau_n) \cdot dt & N \text{ odd} \end{cases}$$

where, for a certain subset of all sets of delay times ($\tau_n$), each delay time corresponds to a single point in physical space, where the values of the correlation function (c) form volumes of probabilities in the subset of the N−1-dimensional space of information regarding the location of the emitter.

4. The method according to claim 1, wherein the correlation function (c) is calculated using differential Doppler frequencies ($\omega_{d1} \ldots \omega_{dN-1}$), where one receiving unit is used as a reference receiving unit for differential Doppler frequency, and the differences in Doppler frequencies between the receiving units are measured relative to the reference receiving unit.

5. The method according to claim 4, wherein the correlation function (c) is calculated by means of HOS according to:

$$c_\omega(\omega_{d1} \ldots \omega_{dN-1} \mid \forall S_n) = \begin{cases} \dfrac{1}{2\cdot\pi\cdot B} \cdot \int_{2\pi\cdot(f_c-B/2)}^{2\pi\cdot(f_c+B/2)} S_0(\omega) \cdot \prod_{n=1}^{N-1} S_n(\omega - \omega_{dn}) \cdot d\omega & N \text{ even} \\ \dfrac{1}{2\cdot\pi\cdot B} \cdot \int_{2\pi\cdot(f_c-B/2)}^{2\pi\cdot(f_c+B/2)} S_0^2(\omega) \cdot \prod_{n=1}^{N-1} S_n(\omega - \omega_{dn}) \cdot d\omega & N \text{ odd} \end{cases}$$

where, for a certain subset of all sets of differential Doppler frequencies ($\omega_{dn}$), each differential Doppler frequency corresponds to a single point in physical space, and where the values of the correlation function (c) form volumes of probabilities in the subset of the N−1-dimensional space of information regarding the location of the emitter.

6. The method according to claim 1, wherein the receiving units receive information relative to a reference receiving unit regarding time difference as well as differential Doppler frequency, said information being used for calculating the correlation function (c) by means of HOS for both time differences and differential Doppler frequencies.

7. The method according to claim 1, further comprising normalizing the correlation function results.

8. A system for detecting and locating a radio frequency emitter, comprising:
    a number (N) of receiving units for receiving a number of signals ($s_0, s_1 \ldots s_{N-1}$) from the emitter, said receiving units utilizing the same bandwidth (B), center frequency ($f_c$) and measurement time duration (T), wherein N is at least three;
    means for utilizing Higher Order Statistics (HOS) to calculate a correlation function (c) between the received signals using one of the received signals ($s_0$) as a reference, wherein the correlation function results form volumes of probabilities in a subset of an N−1-dimensional space of information regarding the location of the emitter, wherein each correlation function result in the subset corresponds to a single point in physical space.

9. The system according to claim 8, wherein the correlation function (c) is calculated using time differences ($\tau_1 \ldots \tau_{N-1} \ldots$), where one receiving unit is used as a reference unit for receiving time measurements, and the differences in time for the signal to reach the other receiving units are measured relative to the reference receiving unit.

10. The system according to claim 9, wherein the correlation function c is calculated by means of HOS according to:

$$c_\tau(\tau_1 \ldots \tau_{N-1} \mid \forall s_n) = \begin{cases} \dfrac{1}{T} \cdot \int_0^T s_0(t) \cdot \prod_{n=1}^{N-1} s_n(t - \tau_n) \cdot dt & N \text{ even} \\ \dfrac{1}{T} \cdot \int_0^T s_0^2(t) \cdot \prod_{n=1}^{N-1} s_n(t - \tau_n) \cdot dt & N \text{ odd} \end{cases}$$

where, for a certain subset of all sets of delay times ($\tau_n$), each delay time corresponds to a single point in physical space, where the values of the correlation function (c) form volumes of probabilities in the subset of the N−1-dimensional space of information regarding the location of the emitter.

11. The system according to claim 8, wherein the correlation function (c) is calculated using differential Doppler frequencies ($\omega_{d1} \ldots \omega_{dN-1}$), where one receiving unit is used as a reference receiving unit for differential Doppler frequency, and the differences in Doppler frequencies between the receiving units are measured relative to the reference receiving unit.

12. The system according to claim 11, wherein the correlation function (c) is calculated by means of HOS according to:

$$c_\omega(\omega_{d1} \ldots \omega_{dN-1} \mid \forall S_n) = \begin{cases} \dfrac{1}{2\cdot\pi\cdot B} \cdot \int_{2\pi\cdot(f_c-B/2)}^{2\pi\cdot(f_c+B/2)} S_0(\omega) \cdot \prod_{n=1}^{N-1} S_n(\omega - \omega_{dn}) \cdot d\omega & N \text{ even} \\ \dfrac{1}{2\cdot\pi\cdot B} \cdot \int_{2\pi\cdot(f_c-B/2)}^{2\pi\cdot(f_c+B/2)} S_0^2(\omega) \cdot \prod_{n=1}^{N-1} S_n(\omega - \omega_{dn}) \cdot d\omega & N \text{ odd} \end{cases}$$

where, for a certain subset of all sets of differential Doppler frequencies ($\omega_{dn}$), each differential Doppler frequency corresponds to a single point in physical space, and where the values of the correlation function (c) form volumes of probabilities in the subset of the N−1-dimensional space of information regarding the location of the emitter.

13. The system according to claim 8, wherein the receiving units include means for receiving information relative to a reference receiving unit regarding time difference as well as differential Doppler frequency, said information being used for calculating the correlation function (c) by means of HOS for both time differences and differential Doppler frequencies.

14. The system according to claim 8, wherein the correlation function results are normalized.

* * * * *